(12) United States Patent
Koechlin

(10) Patent No.: US 10,170,949 B2
(45) Date of Patent: Jan. 1, 2019

(54) ROTATING ELECTRIC MACHINE

(71) Applicant: MOTEURS LEROY-SOMER, Angouleme (FR)

(72) Inventor: Samuel Koechlin, Angouleme (FR)

(73) Assignee: MOTEURS LEROY-SOMER, Angouleme (FR)

( * ) Notice: Subject to any disclaimer, the term of this patent is extended or adjusted under 35 U.S.C. 154(b) by 553 days.

(21) Appl. No.: 14/768,179

(22) PCT Filed: Feb. 13, 2014

(86) PCT No.: PCT/IB2014/058971
§ 371 (c)(1),
(2) Date: Aug. 14, 2015

(87) PCT Pub. No.: WO2014/125433
PCT Pub. Date: Aug. 21, 2014

(65) Prior Publication Data
US 2015/0380994 A1    Dec. 31, 2015

(30) Foreign Application Priority Data

Feb. 14, 2013    (FR) ...................................... 13 51276

(51) Int. Cl.
*H02K 21/12* (2006.01)
*H02K 1/27* (2006.01)
*H02K 15/03* (2006.01)

(52) U.S. Cl.
CPC ............. *H02K 1/27* (2013.01); *H02K 1/2773* (2013.01); *H02K 15/03* (2013.01)

(58) Field of Classification Search
CPC ............ H02K 1/27; H02K 1/28; H02K 1/276; H02K 1/2766; H02K 1/273; H02K 15/03; H02K 1/272; H02K 1/274; H02K 1/2773

USPC ................................ 310/156.08, 156.53, 192
See application file for complete search history.

(56) References Cited

U.S. PATENT DOCUMENTS

| 4,434,546 A | 3/1984 | Hershberger | |
|---|---|---|---|
| 4,486,679 A * | 12/1984 | Jones | H02K 1/2766 310/156.53 |
| 4,916,346 A * | 4/1990 | Kliman | H02K 1/246 310/156.51 |

(Continued)

FOREIGN PATENT DOCUMENTS

| DE | 4423840 A1 | 1/1996 |
|---|---|---|
| DE | 102010039334 A1 | 2/2012 |
| JP | 11355985 A * | 12/1999 |

OTHER PUBLICATIONS

JP 11355985 A, Description—English equivalent.*
Apr. 23, 2015 International Search Report issued in International Application No. PCT/IB2014/058971.

*Primary Examiner* — Thanh Lam
(74) *Attorney, Agent, or Firm* — Oliff PLC

(57) ABSTRACT

A rotating electric machine including: —a magnetic mass, in particular rotoric, including first housings, —a plurality of permanent magnets inserted into the first housings, each permanent magnet having two polar faces, and —nonmagnetic shims inserted into the first housings and/or into second housings formed in the magnetic mass, —the shims being configured to cause a deformation of the first housings reducing the parasitic air gap between at least a polar face of a permanent magnet and the corresponding wall of a first housing.

13 Claims, 2 Drawing Sheets

(56) References Cited

U.S. PATENT DOCUMENTS

| | | |
|---|---|---|
| 5,063,318 A | 11/1991 | Anderson |
| 6,218,753 B1* | 4/2001 | Asano .................... H02K 1/276 |
| | | 310/156.53 |
| 2009/0184597 A1* | 7/2009 | Lee ........................ H02K 1/276 |
| | | 310/156.56 |
| 2013/0181566 A1* | 7/2013 | Kim ....................... H02K 1/276 |
| | | 310/156.49 |
| 2014/0015364 A1* | 1/2014 | Iwatsu ................. H02K 1/2766 |
| | | 310/156.53 |
| 2014/0091664 A1* | 4/2014 | Aoyama .............. H02K 1/2766 |
| | | 310/156.53 |
| 2015/0263573 A1* | 9/2015 | Sathyan ................ H02K 1/276 |
| | | 310/156.45 |

* cited by examiner

ROTATING ELECTRIC MACHINE

The present invention relates to rotating electric machines and notably to those having a rotor or a stator with permanent magnets, notably with flux concentration, and more particularly to rotors or stators of such machines.

BACKGROUND

The rotor or the stator is, as is generally known, composed of a magnetic mass in which permanent magnets are inserted. These permanent magnets may be disposed at the surface, directly facing the air gap, or, in a variant, may be disposed within the magnetic mass, then being said to be "buried".

In order to optimize the cost and the performance of electric machines, it may be necessary to increase the number of magnets, notably when it is not possible to improve the quality thereof or to maintain the same performance with magnets of lesser quality.

Optimal electromagnetic performance is obtained when a buried magnet is in perfect contact, over each of its two polar faces, with the magnetic mass in which it is inserted. The passage of the magnetic flux of the magnets toward the magnetic mass is thus optimized. The term "polar face" of a magnet means a face of the magnet that is magnetized with an identical polarity, thus forming the north or south pole of the magnet.

However, there is generally play between the magnets and the magnetic mass in which the magnets are inserted, thus constituting an air gap from a magnetic viewpoint, which inevitably leads to losses in the electromagnetic performance of the machine. Play of this type may be related to the manufacturing constraints, which, for a reasonable cost, do not make it possible to observe very precise dimensions when cutting the magnetic mass or when manufacturing magnets. Play may also be present because, due to the fact that magnets are sensitive to corrosion, it may be necessary to cover them with a protective coating, which also leads to uncertainty regarding the dimensions of the magnets.

In addition, the installation constraints mean that a certain play must be preserved between the magnets and the magnetic mass so as to facilitate the insertion of the magnets in said mass, notably when the magnetic mass is formed of a stack of thin magnetic sheets. In fact, in this case, the walls of the magnetic mass might not be perfectly straight, taking into account the fact that they are formed of a stack of thin sheets, which may require even greater installation play. As is conventional, a tolerance range of 0.2 mm in the dimensions of the magnets may be provided, such that it may be necessary to provide minimal play of 0.1 mm on ether side of the magnets for the installation, besides the tolerance due to the design of the magnetic mass. Lastly, as is conventional, play of approximately 0.25 mm per magnet may be obtained, for example. The air gaps between rotor and stator currently used in electric machines of low to medium power may be approximately from 0.5 mm to 1 mm.

In the case in which the machine has a plurality of magnets disposed in a number of rows per pole in the magnetic mass, the play of magnets in different rows may be added together, thus lowering the magnetic performance of the machine further still.

There is thus a need to minimize the play between the magnets and the magnetic mass receiving the magnets so as to improve the magnetic performance of rotating electric machines.

SUMMARY

The invention, in accordance with one of the aspects thereof, thus relates to a rotating electric machine having:
- a magnetic mass, in particular a rotor magnetic mass, having first seats,
- a plurality of permanent magnets inserted into the first seats, each permanent magnet having two polar faces, and
- shims, in particular non-magnetic, inserted into the first seats and/or into second seats formed in the magnetic mass, the shims being configured to cause a deformation of the first seats reducing the parasitic air gap between at least one polar face of a permanent magnet and a corresponding wall of a first seat.

The term "first seat" means a seat in which at least one permanent magnet is inserted. As will be discussed hereinafter, a first seat may be devoid of shims or may have shims, for example one or two.

The term "second seat" means a seat devoid of a permanent magnet. As will be discussed hereinafter, a second seat may be devoid of shims or may have shims, for example one or two.

The shims received in the seats of the magnetic mass, whether in the first or the second seats, cause the deformation of the first seats receiving the magnets.

The magnetic mass is preferably made of a very deformable material, routinely made of soft iron, which may easily adapt by plastic deformation so as to match the shape of the magnet and/or of shims received in the corresponding seat.

By way of example, a bend of 1 mm over a length of 10 mm may make h possible to bring the walls of the seat toward the corresponding magnet by approximately 0.25 mm, which basically equates to the above-mentioned size of the parasitic air gap present in known machines between the magnetic mass and the magnet.

Thus, in the invention, thanks to the presence of shims, a deformation of the first seats, notably a plastic deformation, is obtained at least to allow the walls of the first seats to be brought toward, and even contacted with, the poles of the corresponding magnets. The deformation of the sheets may take place in the plane thereof, preferably in a plane perpendicular to the axis of rotation of the machine.

The magnetic mass may be formed of a stack of magnetic sheets, preferably of one-piece magnetic sheets, or of one or more individual stack (s) wound over itself/themselves around the axis of rotation. Each sheet layer of the magnetic mass may be formed integrally. The magnetic mass may be devoid of individual polar parts.

The magnetic mass may be a rotor mass, or in a variant a stator mass. The rotor may have a number of poles between two and twelve, more preferably between four and eight.

The permanent magnets may be made of ferrites or with rare earths or with any other type of magnetic material. The arrangement of the seats makes it possible to concentrate the flux of the magnets and to obtain useful performances with magnets made of ferrites.

The slums may deform the seats by means of a wedge effect as the shims are inserted into the magnetic mass. Where necessary, the seats are deformed after an action of expansion of the shims, for example when these are formed by rivets.

The shims may be made of a non-magnetic material, for example a non-magnetic steel, so as not to have a parasitic effect on the circuit of the magnetic flux in the magnetic mass.

The shims may have, in cross section, a shape that may be selected from the following, non-limiting list: trapezoidal, circular, D-shaped.

A shim preferably has a portion of which the section varies progressively along the longitudinal axis of the shim, so as to promote the insertion of the shim into the seat. For example, the shim may have a portion of which the section is constant, extending for example over a majority of the length of the shim, and an end of which the section varies progressively, this end possibly being cut for example once the shim has been fully inserted into the magnetic mass.

The shims may be inserted into the first seats and may come into abutment against the magnets. The risk of damaging the corresponding magnet, when this is made of ferrite, is minimized by the fact that the compressive strength of ferrite magnets is excellent, for example approximately 900 MPa, in particular in the event that the bearing contact is uniform.

The shims are inserted into the magnetic mass preferably parallel to the axis of rotation of the machine.

The insertion of shims into the first seats also makes it possible to improve or to provide a cushioning of the permanent magnets in their seat. There is thus no need to glue these, either by means of a glue or by means of an impregnating varnish, or to wedge them in another way to prevent them from moving in their seat.

In this case as well the shims are preferably D-shaped, the long side of the D corresponding to the face of the shim coining into contact with the permanent magnet. Contact over a large surface makes it possible to minimize the risk of damaging the magnet during insertion of the shim or subsequently during use of the machine. The shim or the shims associated with a magnet may be inserted along a face of the magnet perpendicular to the polar faces of the magnet.

Two shims for example may be inserted one on either side of a magnet in a first seat accommodating said magnet. The shims are inserted along faces of the magnet that are preferably perpendicular to the polar faces thereof.

In a variant or additionally, shims may be inserted into second seats devoid of permanent magnets. These shims are preferably of tapered cross section, in other words are wedge-shaped, for example trapezoidal, or are circular or are D-shaped in cross section.

Shims may be inserted into second seats disposed between two consecutive first seats in a row of seats, permanent magnets being inserted in at least one of these first seals, or even in the two consecutive seats.

The electric machine may be devoid of second seats and may have only first seats in which permanent magnets are inserted. Shims may be inserted, in some or in all of the first seats.

On the whole, the magnetic mass may have permanent magnets inserted in all or some of the first seats, for example in at least half the first seats, or even in more than two thirds of the first seats, or even better in all the first seats.

The magnets are disposed in the first seats so as to define poles of the rotor. The seats may be disposed in the form of the are of a circle or in a V shape, for example by being disposed symmetrically with respect to a radial axis of the corresponding pole. The terra "radial axis of the pole" means an axis of the pole oriented radially, i.e. in accordance with a radius of the magnetic mass. It may be an axis of symmetry for the pole. This radial axis may intersect the top of the pole.

The seats may be disposed in rows of seats so as to define the poles of the magnetic mass. Each pole may have at least three seats.

The seats may be disposed in one or more rows per pole. Each pole may have at least two rows, or even at least three rows. The seats may be of elongate form and may each have two short sides and two long sides. The long sides may form the walls of seats intended to come into contact with the polar faces of permanent magnets under the effect of shims. A row may have at least two, or better at least three seats disposed consecutively, the short sides thereof defining a material bridge between two consecutive seats in the same row.

The magnetic mass may have material bridges formed between two consecutive seats in a row of seats so as to improve the cohesion of the machine under the effect of centrifugal forces. The material bridges may be oriented radially.

Material bridges may be formed between two first seats in which permanent magnets are inserted, and/or between a first seat and a second seat devoid of permanent magnet, and/or between a seat, which may or may not be accommodating a permanent magnet, and the air gap of the machine formed between the stator and the rotor.

At least one material bridge may be of general curved shape. A material bridge of curved shape may be formed notably between a first seat in which a permanent magnet is inserted and a second seat devoid of permanent magnet, and even possibly devoid of shim. The curved shape of the material bridges makes it possible to benefit from a sufficient reduction of the play between the magnetic mass and the magnets, without excessive deformation of the bridges.

All the shims within the same series of consecutive seats are preferably inserted simultaneously so as to promote easier insertion.

In addition, the magnetic mass may have a cross section of circular outer shape, or in a variant of general circular shape also having cutouts at the seats, which cutouts help to compensate for the deformation of the seats and the deformation of any bridges between the seats.

The invention also makes it possible to rigidify the material bridges through the deflection, applied thereto by the shims, which, by introducing a radial prestress in the rotor, makes it possible to reduce the swelling thereof under the effect of the centrifugal force during use thereof and may thus make it possible to ensure a constant value of the air gap, including at high speed.

The magnetic mass may have, at the periphery thereof, cutouts delimited at least in part by material bridges coming into contact with shims.

The machine may have second seats devoid of magnets and of shims, disposed between two consecutive seats receiving magnets, the second seats preferably being delimited at least in part by two opposite material bridges, each in contact with a shim.

The machine may have first seats receiving magnets and shims and second seats receiving only shims, these second seats being delimited at least in part by material bridges defining the outer contour of the magnetic mass at least in part, second seats without shims or magnets being disposed between the first seats with magnets and shims and the second seats with just shims.

The magnetic mass may have seats receiving shims, these seats being delimited at least in part by material, bridges, of which one is adjacent to the air gap and the other is adjacent to a seat devoid of magnet. The presence of these shims may be useful to ensure a homogenous deformation of the periphery of the rotor mass. These shims preferably have an ovoid section, either alone or when grouped in pairs within the same seat.

In one exemplary embodiment the seats within the same row are disposed along a central branch and two side branches one on either side of the central branch, for example giving a U-shaped configuration, the central branch for example being the only one to have one or more permanent magnets, the side branches accommodating no permanent magnet.

For the same pole the seats of this pole may be disposed in a single row. The concavity of the row may be oriented toward the top of the pole, i.e. toward the air gap.

For the same pole the seats of this pole are preferably disposed in a number of rows, each with a concavity that may be oriented toward the top of the pole, notably in substantially concentric rows. The term "concentric" means that median axes of the seats of the rows, considered in a plane perpendicular to the axis of rotation of the rotor, intersect one another at the same point. This arrangement in a number of concentric rows makes it possible to improve the concentration of the flux without necessarily having to increase the size of the seats or the number of permanent magnets necessary to obtain an equivalent flux. The number of rows per pole in particular may be two, three or four.

The arrangement of the seats and/or of the material bridges in a row is preferably symmetrical with respect, to the radial axis of the pole.

In a row, the seats may be disposed in a V shape or in a U shape, the U possibly having a form flared toward the air gap. In other words, the seats constituting the side branches of the U might not be parallel to one another. When the first seats within the same row are disposed in a U-shaped arrangement, the first central seat may be of longer or shorter length than that of a branch of the U. In one exemplary embodiment the branches of the U are shorter than the central branch constituting the base of the U.

The first seats may each extend, when considered in section in a plane perpendicular to the axis of rotation of the rotor, in a longitudinal axis which may be straight or curved.

The first seats may have a constant or variable width along their longitudinal axis, in a plane perpendicular to the axis of rotation of the rotor.

The short, sides of a first seat are oriented for example in the direction of the radial axis of the pole with increasing distance from the axis of rotation, and converge for example substantially toward the top of the pole.

The first seats may have, in cross section, i.e. perpendicularly to the axis of rotation, a rectangular or trapezoidal general shape, however this list is not limiting.

The short sides of a first seat may be perpendicular to the long sides of said first seat. The short sides of a first seat may be inclined relative to the long sides of said first seat.

At least one first seat may have two long sides, one of the long sides being shorter than the other. In this case, for example when the first seat is of trapezoidal general shape, the shorter of the long sides may be situated closer to the air gap than the longer of the long sides.

The short sides of a seat may be straight or curved.

The permanent magnets may be of rectangular general shape. Taking into account the shape of the seats, the placement of the magnets in the seats may leave a free space in the seat between the magnets and the short sides of the corresponding seat. The free space for example is of triangular general shape.

The machine may be a reluctance machine. It may constitute a synchronous motor.

The machine may function at a rated peripheral speed (tangential speed taken at the outer diameter of the rotor), which may be greater than or equal to 300 meters per second, the machine according to the invention allowing operation at significant speeds if this is desired.

The machine may be relatively large in size. The diameter of the rotor may be greater than 50 mm, or better still greater than 80 mm, for example between 80 and 300 mm.

The invention also relates to a method for manufacturing a rotor or a stator according to the invention, as defined above, in which shims are introduced into the magnetic mass in order to reduce the parasitic air gaps between the magnets and the magnetic mass.

BRIEF DESCRIPTION OF THE DRAWINGS

The invention will be better understood upon reading the following detailed description of non-limiting exemplary implementations thereof and under examination of the accompanying drawing, in which.

DETAILED DESCRIPTION OF EMBODIMENTS

Figure 1:
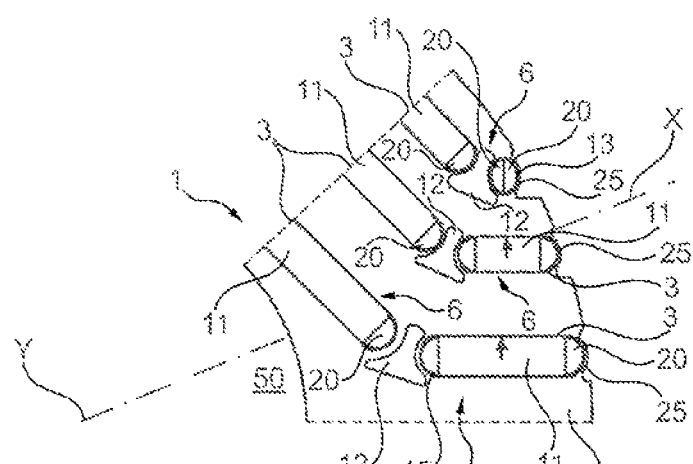
FIG. 1 is a schematic and partial view of a rotor according to the invention.
Figure 2:
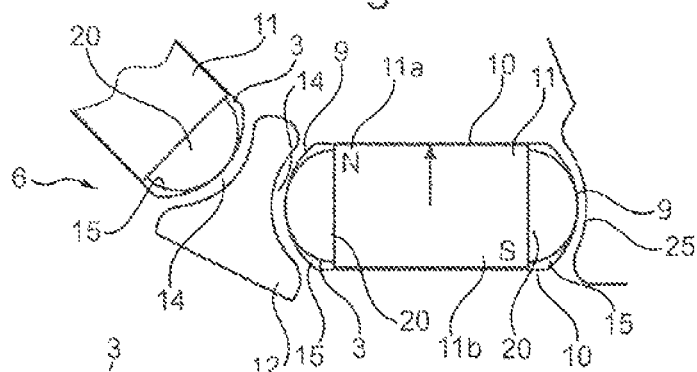
FIG. 2 shows a detail of the rotor embodiment of FIG. 1.

In FIGS. 1 and 2 the shims are shown in a position prior to insertion.

FIGS. 1 to 4 illustrate a rotor 1 of a rotating electric machine, having a rotor magnetic mass 2 with flux concentration, in which first seats 3 are formed so as to define the poles 4 of the rotor, each pole having a radial axis X. Only half of a pole 4 is shown in the example described. The magnetic mass 2 extends around a central bore 50 which, receives a shaft (not shown).

Permanent magnets 11 are inserted into each of the first seats 3, the direction of magnetization of said magnets being illustrated by arrows. Each permanent, magnet 11 has two polar feces 11a, 11b, one magnetized north (N) and the other south (S).

In this example the rotor has seven first seats 3 per pole 4, which are disposed in three concentric rows 6 around each of the poles, the concavity of the rows being oriented toward the air gap. Two rows 6 have three first seats 3 disposed consecutively in the row, and one row 6, which is closest to the air gap, has a single first seat 3. The three rows 6 of the same pole are of decreasing length toward the air gap, the longest being situated on the side of the axis of rotation Y and the shortest being situated on the side of the air gap.

The permanent magnets are of rectangular general shape in cross section in this example. The first seats 3 are of elongate shape. They each have two short sides 9 and two long sides 10. The placement of the magnets 11 in the first seats 3 may leave play between the polar faces of the magnets 11 and the walls of the corresponding seat, defined by the long sides 10, as well as two free spaces 15 in each seat between the magnet and the short sides 9 of the corresponding seat. The free space 15 may be of a general D shape, as illustrated in FIG. 2, or may be of another shape. The short sides 9 of a seat 3 may be straight or curved.

The electric machine has non-magnetic D-shaped shims 20 inserted in the magnetic mass 2, the shims 20 being configured to cause a deformation of the first seats 3 during insertion of the shims and to improve the contact between at least one polar face 11a, 11b of the permanent magnets 11 and a corresponding wall 10 of the first seats 3 in which the magnets are inserted.

In the described example each first seat 3 has two shims 20, each placed on either side of the magnet 11. The shims 20 are inserted along non-polar faces of the magnet, perpendicular to the polar faces 11a, 11b of the magnet.

Figure 3:
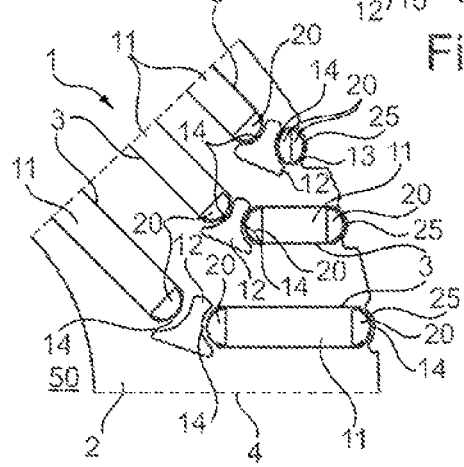
FIG. 3 is a schematic, and partial view of the rotor of FIG. 1 after insertion of shims.
Figure 4:
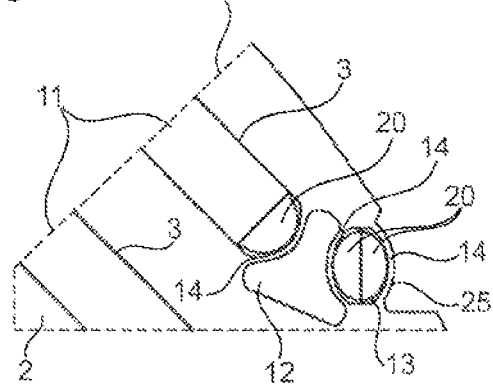
FIG. 4 shows a detail of the rotor embodiment of FIG. 3, and FIGS. 5 to 8 are schematic and partial views, similar to FIG. 2, of variants.

The electric machine may also have, as illustrated, second seats 12 and 13 devoid of permanent magnets. Some second seats 12 are, in the example described, disposed in a row 6 of seats between two first seats 3 and are thus empty, i.e. devoid of shims, as illustrated in FIGS. 2 and 4. Other second seats 13 are disposed between a second empty seat 12 and the air gap, thus being intended to receive a shim 20, as can be seen in FIGS. 3 and 4, at the row closest to the air gap.

The second empty seats 12, together with a consecutive seat 3 or a seat 13 receiving a shim 20 within the same row 6, define a material bridge 14. The material bridges 14 deform during the insertion of shims 20 in the seats of the magnetic mass 2, whether in the first seats 3 or the second seats 12, 13, thus causing the deformation of the first seats 3 receiving the magnets 11. In particular, the long sides of the seats 3 move toward one another slightly due to the push exerted in opposite directions on the short sides by the shims 20. In FIGS. 3 and 4 the contour of the magnetic mass after deformations induced by the shims has been shown in a shaded manner.

The magnetic mass 2 has a cross section of generally circular outer shape having cutouts 25 over the circumference thereof at seats 3, 13, which help to compensate for the deformation of seats and of material bridges 14 between the seats.

The shims 20 may have, in cross section, a shape that may be other than a D shape, for example they may be trapezoidal or circular.

Figure 5:
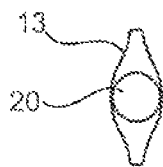

By way of example, an exemplary embodiment has been illustrated in FIG. 5 in which the shims 20 of circular cross section are introduced into second seats 13 of generally flattened shape in cross section prior to deformation. The second seats 13 may be disposed between two first seats 3 devoid of shims.

Figure 6:
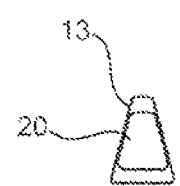

The shims 20 in a variant, may also be of general prismatic shape in cross section, as illustrated in FIG. 6. The second seat 13 is then likewise of prismatic general shape in cross section prior to deformation. The prismatic shape of the shims 20 allows the radial wedging thereof after their insertion, by displacement in the plane of the sheet, preferably in the direction of the exterior of the rotor.

The electric machine, in a variant, may also be devoid of a second seat and may have only first seats 3 in which permanent magnets 11 are inserted. Shims 20 may be inserted in some or in all of these first seats 3.

Figure 7:
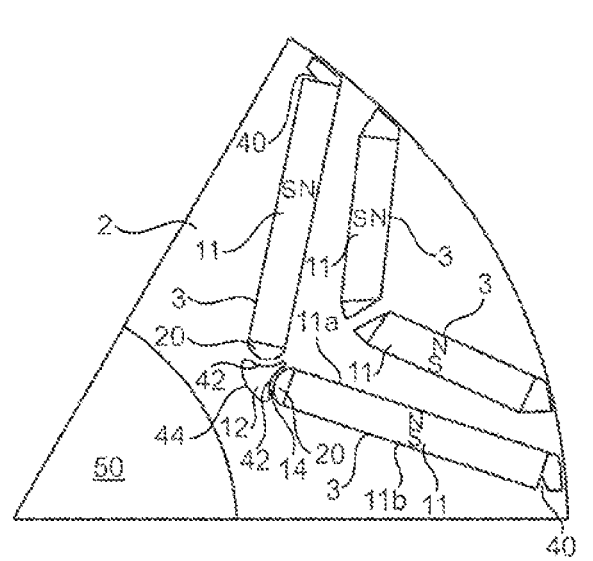
Figure 8:
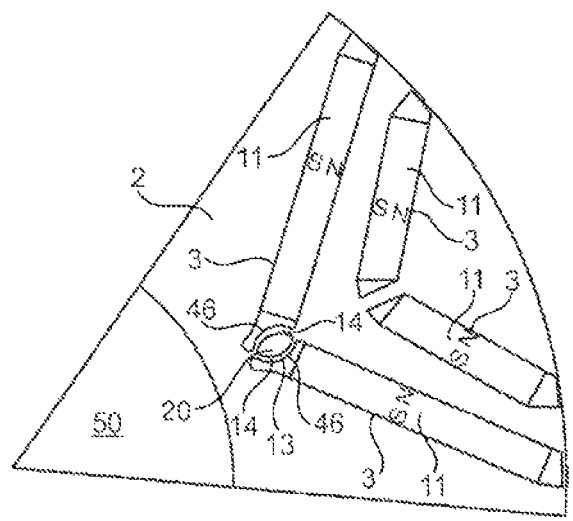

In the example of FIGS. 7 and 8 the seats 3 are intended to receive the magnets 11 having a V-shaped arrangement, for example with two rows of magnets 11 as illustrated.

The seats 3 receiving the magnets 11 of greater dimension, in the example of FIG. 7, have a recess 40 which serves as a stop for the corresponding magnet 11. The shape of the seat extending between the seats 3 receiving the magnets 11 of longer length differs between the variants of FIGS. 7 and 8.

In the example of FIG. 7 the seat 12 has two opposite circular edges 42 which, together with the adjacent seats 3, delimit material bridges 14 of substantially constant width. The edges 42 are connected by a concave edge 44 toward the outside.

Two D-shaped shims 20 are introduced into the seats 3 to the side of the seat 12.

In the example of FIG. 8 the seat receiving the shim 20 has a lenticular shape, defining, together with the adjacent seats 3, material bridges 14 of substantially constant width. The seats 3 adjacent to this seat, have concave edges 46 toward this seat. The shim 20 has an ovoid shape, in the examples of FIGS. 7 and 8 the shims are introduced parallel to the axis of rotation of the rotor.

The invention is not limited to the illustrated examples. In particular, the polarity of the rotor may be modified without departing from the scope of the present invention.

The rotor may cooperate with any type of stator, with distributed or concentrated winding.

The magnetic mass 2 may of course have a single row 6 of seats 3, 12, 13 per pole 4.

The seats 3, 12, 13 may each extend along a longitudinal axis which may be straight, as illustrated before, or curved.

In FIGS. 1 to 4 the seats 13 each receive two shims, which together have an ovoid section, in a variant the seats 13 each receive a single shim, for example of ovoid section.

The expression "having a" may be understood to be synonymous with "having at least one".

The invention claimed is:

1. A rotating electric machine, having:
    a magnetic mass having first seats,
    a plurality of permanent magnets inserted into the first seats, each permanent magnet having two polar faces, and
    shims inserted into the first seats and/or into second seats formed in the magnetic mass,
    the shims being configured to cause a deformation of the first seats reducing the parasitic air gap between at least one polar face of a permanent magnet and a corresponding wall of a first seat,
    the shims being made of a non-magnetic material,
    the magnetic mass having material bridges formed between two consecutive seats within a row of seats, the shims coming into contact with these material bridges,
    wherein at least one material bridge is of curved general shape.

2. The electric machine as claimed in claim 1, wherein the magnetic mass is formed of a stack of magnetic sheets.

3. The electric machine as claimed in claim 1, wherein shims are inserted into the first seats.

4. The electric machine as claimed in claim 1, wherein two shims are inserted one on either side of a magnet into a first seat accommodating the corresponding magnet.

5. The electric machine as claimed in claim 1, wherein shims are inserted into second seats devoid of permanent magnets.

6. The electric machine as claimed in claim 5, wherein shims are inserted into second seats disposed between two consecutive first seats in a row of seats, permanent magnets being inserted into at least one of these first seats.

7. The electric machine as claimed in claim 1, being devoid of second seats and having only first seats in which permanent magnets are inserted.

8. The electric machine as claimed in claim 1, wherein the shims, in cross section, have a shape selected from the following list: trapezoidal, circular, D-shaped.

9. The electric machine as claimed in claim 1, the seats being disposed in rows of seats so as to define the poles of the magnetic mass.

10. The electric machine as claimed in claim 1, the magnetic mass having, at the periphery thereof, cutouts delimited at least in part by material bridges coming into contact with shims.

11. The electric machine as claimed in claim 1, having second seats devoid of magnets and shims, disposed between two consecutive seats receiving magnets.

12. The electric machine as claimed in claim 1, having first seats receiving magnets and shims and second seats receiving only shims, these second seats being delimited at least in part by material bridges defining the outer contour of the magnetic mass at least in part, second seats with neither shims nor magnets being disposed between the first seats with magnets and shims and the second seats with only shims.

13. The electric machine as claimed in claim 1, the magnetic mass being a rotor mass.

* * * * *